(12) United States Patent
Piermarini et al.

(10) Patent No.: US 10,502,294 B2
(45) Date of Patent: Dec. 10, 2019

(54) LINEAR ELECTRO-MECHANICAL ACTUATOR, PREFERABLY FOR WATER CUTTING

(71) Applicant: UMBRA CUSCINETTI S.p.A., Foligno (IT)

(72) Inventors: Marcello Piermarini, Foligno (IT); Massimiliano Bosi, Foligno (IT); Luciano Pizzoni, Foligno (IT); Nicola Borgarelli, Perugia (IT)

(73) Assignee: UMBRAGROUP S.P.A., Foligno (PG) (IT)

( * ) Notice: Subject to any disclaimer, the term of this patent is extended or adjusted under 35 U.S.C. 154(b) by 797 days.

(21) Appl. No.: 15/189,546

(22) Filed: Jun. 22, 2016

(65) Prior Publication Data

US 2017/0248209 A1    Aug. 31, 2017

(30) Foreign Application Priority Data

Feb. 25, 2016    (IT) .................. 102016000019556

(51) Int. Cl.
| | |
|---|---|
| *F16H 25/20* | (2006.01) |
| *F16H 25/12* | (2006.01) |
| *F16H 25/24* | (2006.01) |
| *B26F 1/26* | (2006.01) |
| *B26F 3/00* | (2006.01) |
| *F16H 25/22* | (2006.01) |

(52) U.S. Cl.
CPC ............. *F16H 25/20* (2013.01); *B26F 1/26* (2013.01); *B26F 3/004* (2013.01); *F16H 25/12* (2013.01); *F16H 25/2204* (2013.01); *F16H 25/2454* (2013.01); *F16H 2025/204* (2013.01)

(58) Field of Classification Search
CPC .......... F16H 25/00; F16H 25/04; F16H 25/08; F16H 25/12; F16H 25/18; F16H 25/20; F16H 25/204; F16H 25/2204; F16H 25/24; F16H 25/2454; F16H 2025/2037; F16H 2025/204; B26F 1/26; B26F 3/004
See application file for complete search history.

(56) References Cited

U.S. PATENT DOCUMENTS

| 3,157,058 A | 11/1964 | Haller |
| 9,212,657 B2 | 12/2015 | Reukers |
| 9,400,047 B2 * | 7/2016 | Johnson .............. F16H 57/0467 |

(Continued)

FOREIGN PATENT DOCUMENTS

| WO | 01/88402 A1 | 11/2001 |
| WO | 2009/117765 A1 | 10/2009 |

(Continued)

OTHER PUBLICATIONS

Italian Search Report and Written Opinion issued in Application No. ITUB20161067 dated Oct. 21, 2016.

*Primary Examiner* — Prasad V Gokhale
(74) *Attorney, Agent, or Firm* — Young & Thompson

(57) ABSTRACT

A linear electro-mechanical actuator (1) preferably for water cutting, makes it possible to significantly improve the working conditions of the actuator (1), so as to optimize its load capacity and increase the working life of the actuator (1), and makes it possible to reduce the risk of breakage or damage of the actuator (1) following loss of control of the movement aimed at producing the force applied by the actuator (1).

18 Claims, 15 Drawing Sheets

(56) References Cited

U.S. PATENT DOCUMENTS

2015/0285349 A1* 10/2015 Pizzoni .............. F16H 25/2214
                                                          74/89.23
2015/0345581 A1    12/2015 Shin et al.
2017/0067455 A1*  3/2017 Reukers ................... F04B 1/02

FOREIGN PATENT DOCUMENTS

WO      2012/034165 A1    3/2012
WO      2015/127497 A1    9/2015

* cited by examiner

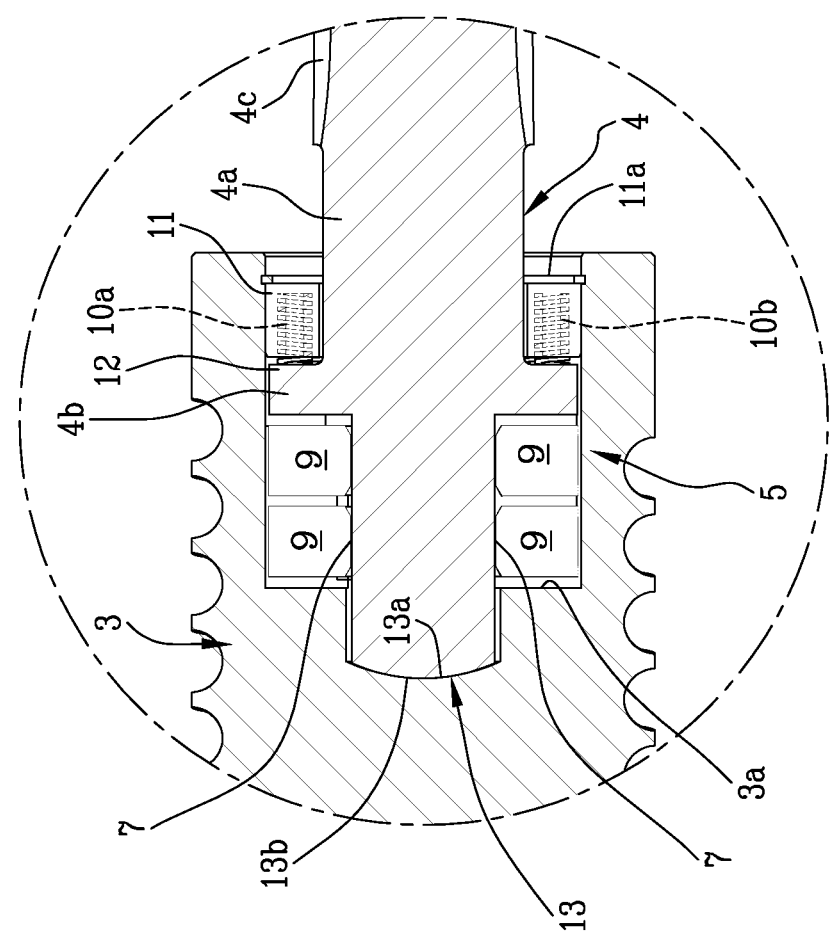

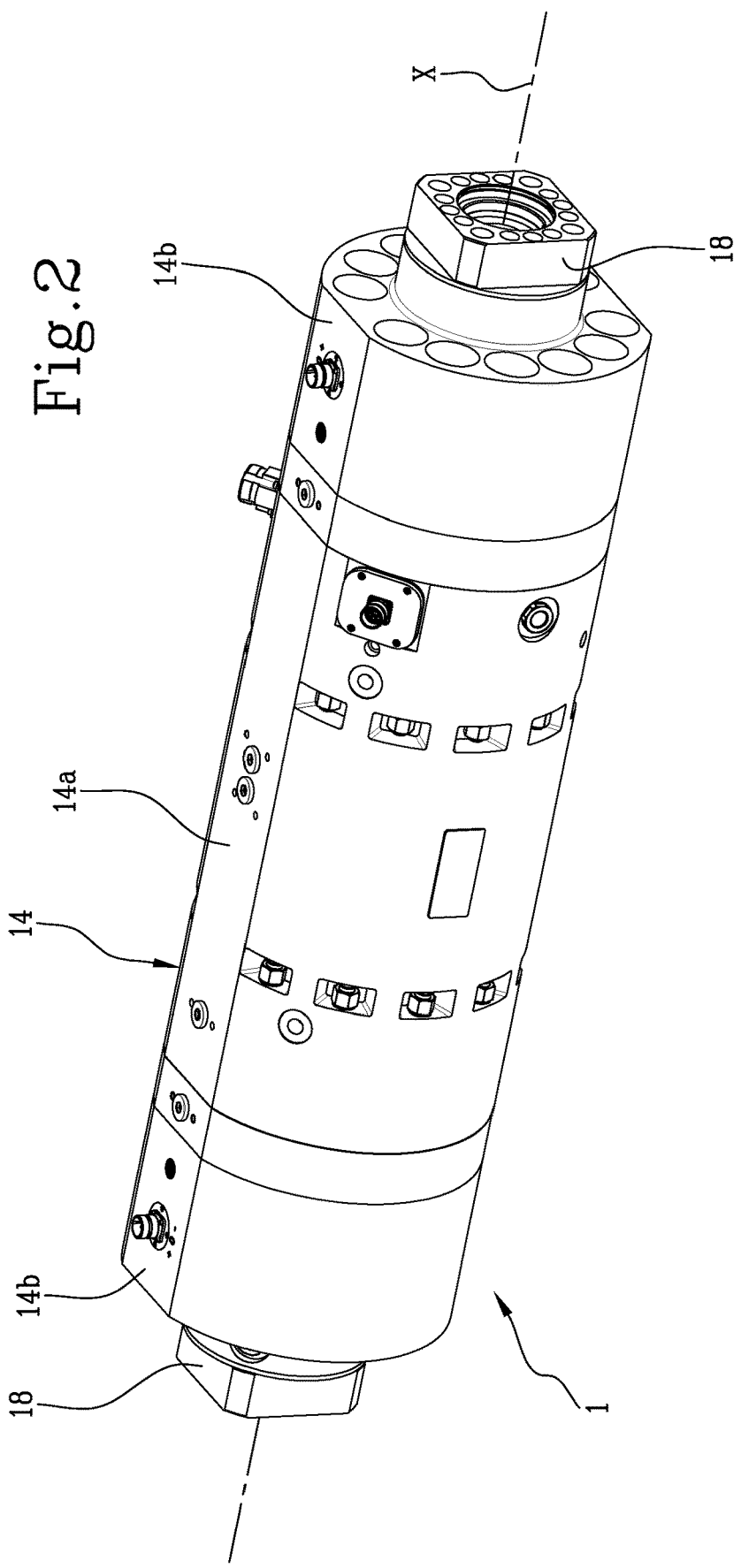

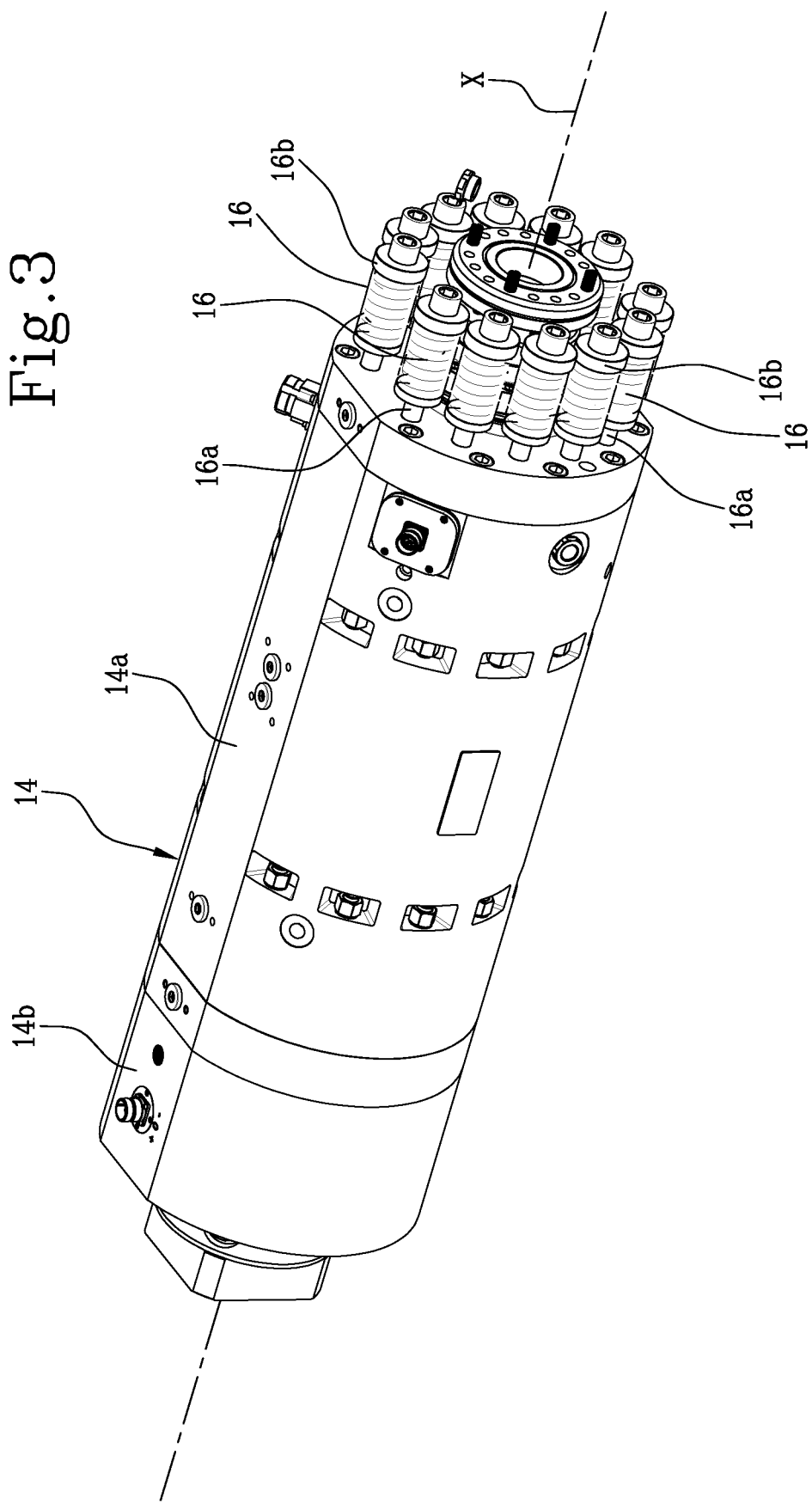

LINEAR ELECTRO-MECHANICAL ACTUATOR, PREFERABLY FOR WATER CUTTING

BACKGROUND OF THE INVENTION

This invention relates to a linear electro-mechanical actuator preferably for water cutting, which makes it possible to significantly improve the working conditions of the actuator, so as to optimise its load capacity and increase the working life of the of the actuator, and which makes it possible to reduce the risk of breakage or damage of the actuator following loss of control of the movement aimed at producing the force applied by the actuator.

Currently, the linear actuators for water cutting, or water jet, such as, for example, the one described in U.S. Pat. No. 9,212,657, have a motor, which may be, for example, electric, a shaft which acts as the rotor of the motor, a lead nut coupled to the rotor, and a translation unit, supported by a supporting structure, which may act as a casing for the actuator.

The motor may have permanent magnets, in which case the magnets are preferably mounted on the rotor shaft of the motor. The motor usually comprises a stator in which is situated the rotor shaft, preferably coaxially.

The translation unit comprises a screw, for example a recirculating ball screw, and at least a rod integral with the screw. The rod may have the purpose of pusher for generating at least a force in turn designed for generating the compression of at least one fluid.

The lead nut is coupled to the rotor shaft and is situated in the same rotor shaft coaxially with the same shaft. The screw is meshed with the lead nut, in the sense that it is coupled to the lead nut and situated in the lead nut coaxially with it, in such a way as to be also subjected, by the interposition of the lead nut and the rotor shaft, to the drive torque exerted by the motor.

The supporting structure comprises a main portion for housing the motor, the lead nut and the screw.

The actuator commonly also comprises an anti-rotation system or mechanism, which is such that the rotation of the lead nut, caused by the motor, generates the translation of the screw and the translation of the rod along a direction of translation. Under ideal conditions, the direction of translation is aligned with an axis of extension of the rod, which at least at one end is constrained to the screw.

This rotation the lead nut and the translation of the translation unit are preferably an alternating rotation and, respectively, an alternating translation.

Moreover, the actuator may be a single acting or a double-acting actuator. In the latter case, the translation unit usually comprises at least one further rod situated, along the axis of translation, on the opposite side of the screw relative to the rod described above.

Hereafter, for convenience, only a single rod connected to the screw is considered, even though all the following technical concepts can be applied to an actuator with more rods, and, as regards the features which relate to the rod, to each of them.

The alternating translation of the rod is such a way that the head portion of the rod, which comprises the end of the rod opposite the one at which the rod is constrained to the screw, generates the compression of the fluid located in a compression chamber. The compression chamber is advantageously defined at least partly by an interface portion of the supporting structure. The interface portion is adjacent to the main portion of the supporting structure, along the axis of translation of the rod, and is fixed to the main portion. The main portion and the interface portion are currently integrated in a single part.

The anti-rotation system may comprise, for example, a linear recirculating ball screw bearing.

The anti-rotation system is designed to exert an anti-rotation torque on the translation unit in such a way that the alternating rotation of the lead nut causes an alternating translation of the translation unit along the longitudinal axis of extension of the rod.

The anti-rotation system may comprise locking means designed to exert at least a part of the pair of anti-rotation torque on the translation unit. The locking means can also be designed to guide the translation of the translation unit along the direction of translation.

The anti-rotation system may comprise at least one linear bearing, for example a recirculating ball screw bearing, designed to guide the translation of the translation unit along the direction of translation.

The linear bearing may also be designed to exert at least a part of the anti-rotation torque on the translation unit.

The anti-rotation system therefore contributes, at least in part, to defining the direction of translation.

Under ideal conditions, which practically never occur, the axis of extension of the rod is aligned with the direction of translation.

The actuators currently known suffer from some problems regarding the possible misalignment which can easily occur between the axis of extension of the rod, which coincides with or in any case is at least parallel to that of the screw to which the rod is fixed, and the direction of translation defined by the anti-rotation system.

This misalignment is the cause of radial or lateral loads which act on the screw and in particular on the balls of a recirculating system of the screw, and which can also act on the anti-rotation system, and therefore on the balls of the anti-rotation system if it comprises a linear recirculating ball screw bearing.

These loads can cause an increase in the deterioration of the performance of the actuator, lowering the reliability of the actuator; as well as premature failures.

SUMMARY OF THE INVENTION

The aim of this invention is to provide a linear electro-mechanical actuator preferably for water cutting which allows a significant reduction in the progressive degradation of the performance of the actuator due to use, compared with the prior art electro-mechanical actuators.

Another aim of this invention is to provide a linear electro-mechanical actuator preferably for water cutting which allows a significant increase in the reliability of the actuator, also reducing the risk of premature failure, compared with the prior art electro-mechanical actuators.

Yet aim of this invention is to provide a linear electro-mechanical actuator preferably for water cutting which allows a significant increase in the performance of the actuator, exploiting to the maximum extent the load capacity of the translation unit, compared with the prior art electro-mechanical actuators.

Moreover, in the currently known electro-mechanical actuators there is the risk of loss of control of the alternating motion of translation of the translation unit, due to a fault to the motor or due to other accidental events which can affect the control system of the motor. In this case, the translation unit continues its translation due to inertia, very easily causing catastrophic events such as the destruction of essential components of the actuator, making the actuator unusable with consequent economic damage. These catastrophic events require expensive repairs and interruption of the operation of the actuator.

A further aim of this invention is to provide a linear electro-mechanical actuator preferably for water cutting which makes it possible to reduce significantly the risk of damage or failure of the components of the actuator in the case of loss of control of the alternating movement of the translation unit, compared with the prior art electro-mechanical actuators.

These aims are achieved by a linear actuator according to at least one of the appended claims to the this patent application, or according to at least any combination of one or more of the claims.

BRIEF DESCRIPTION OF DRAWINGS

The features of this invention are described in detail below relating to a possible embodiment of the invention to be considered by way of a non-limiting example of the concepts claimed.

The detailed description which follows relates to the accompanying drawings, in which:

FIG. 1a is a detailed view of a part of FIG. 1;

FIG. 2 is a perspective view of the embodiment;

FIG. 3 is a perspective view of the embodiment with at least one component removed;

DESCRIPTION OF THE PREFERRED EMBODIMENTS

Figure 1:
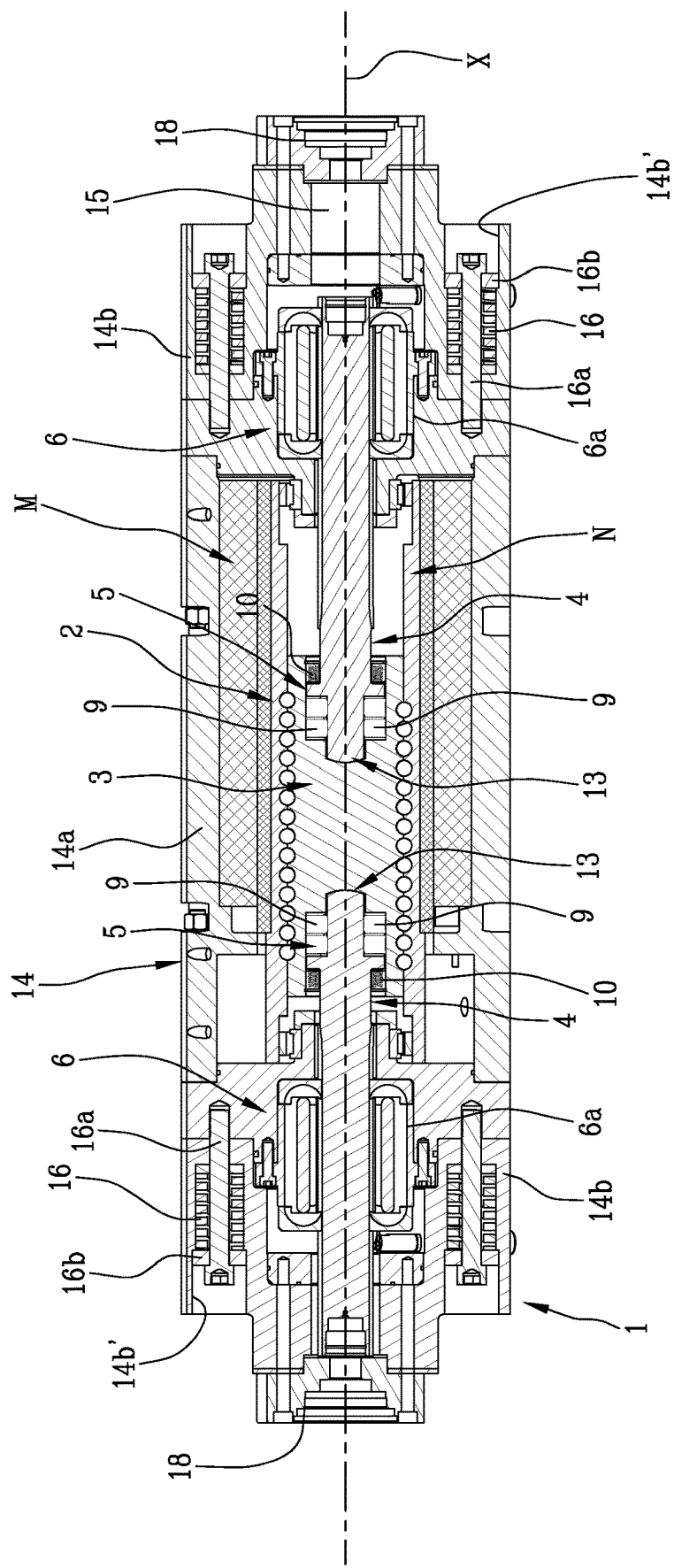
FIG. 1 is a transversal cross-section of a possible embodiment of an electro-mechanical actuator according to this invention, in a plane containing the axis of translation of the translation unit.

FIG. 1 shows a lateral view and a cross section an actuator 1 according to a possible embodiment of this invention.

The actuator 1 comprises a motor "M" operatively associated with a lead nut "N", so as to be able to cause a rotation of the lead nut "N" on itself. In the example illustrated in the accompanying drawings the motor "M" and the lead nut "N" are not shown.

It should be noted, however, that the lead nut "N" performs the function of rotor of the motor "M".

The motor "M" may be of the electric type. In this case, the motor "M" comprises a stator inside of which it is designed to rotate the lead nut "N" on itself. If the motor "M" is the type with permanent magnets, the magnets are preferably mounted on the lead nut "N".

In the example of the actuator 1 illustrated in the accompanying drawings, the motor "M" is configured in such a way as to rotate the lead nut "N" about the axis labelled X, which can be defined as longitudinal axis X. In the example shown, the actuator 1 practically extends and is positioned along the longitudinal axis X.

Preferably, the lead nut "N" is prevented from translating along the longitudinal axis X, by means of a locking system designed for this purpose, and also not shown.

The actuator 1 comprises a translation unit 2. The translation unit 2, shown in FIGS. 1 and 5 and shown also at least in FIG. 4, comprises at least a rod 4 and a screw 3. The translation unit 2 comprises a constraining system 5 between the rod 4 and the screw 3. The constraining system 5 is therefore configured for making a constraint between the rod 4 and the screw 3.

The constraining system 5, as will be described in more detail below, may be defined, insofar as the embodiment illustrated, as an elastic joint between the rod 4 and the screw 3.

The rod 4 may have the purpose of a pusher.

Figure 10:
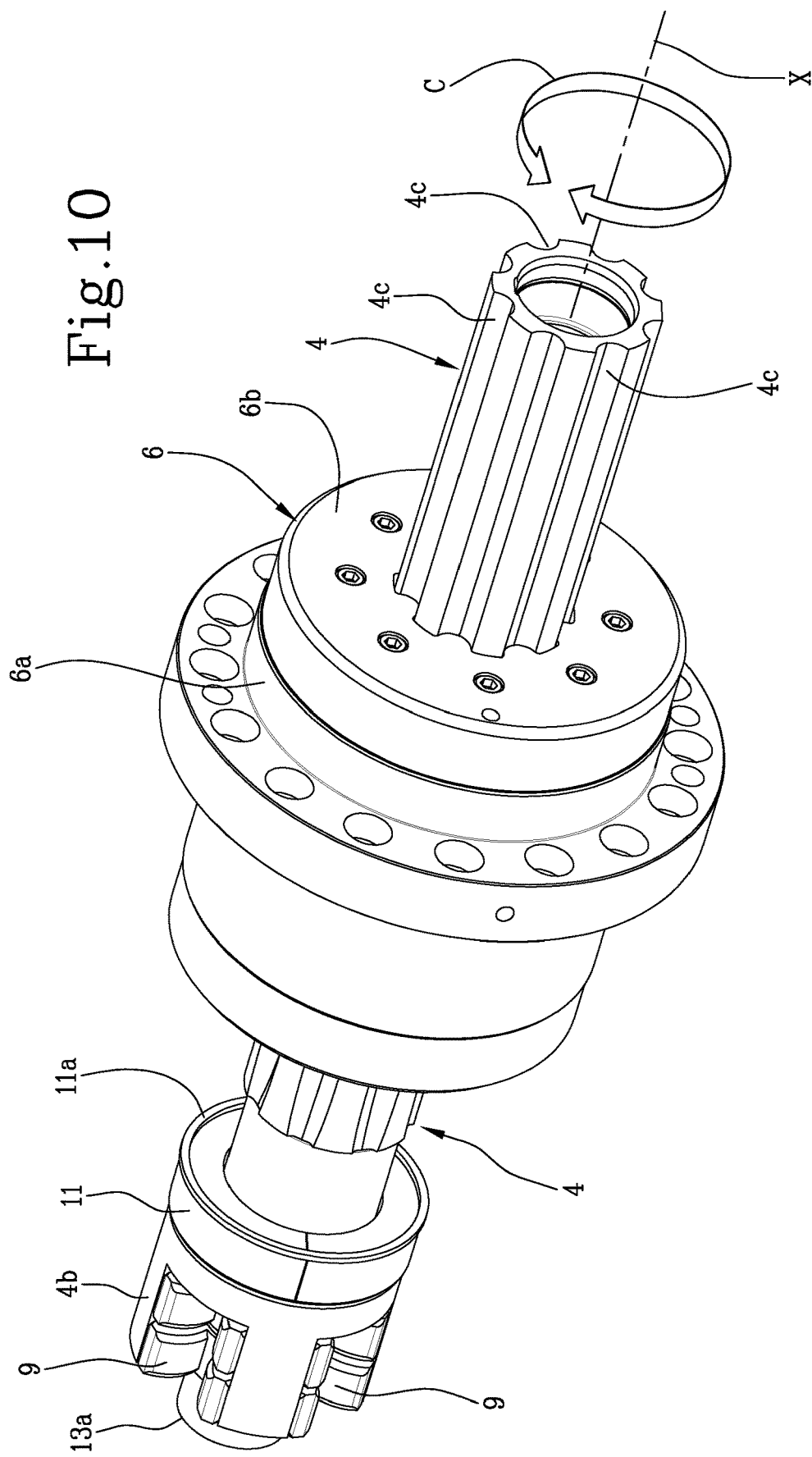
FIG. 10 is a view in which another part of the anti-rotation system is added to the components shown in FIG. 9.

As shown for example in FIG. 10, the actuator 1 comprises an anti-rotation system or mechanism 6 designed to exert an anti-rotation torque on the translation unit 2 in such a way that the rotation of the lead nut "N" causes a translation of the translation unit 2 along the longitudinal axis X. The longitudinal axis may therefore be considered as a direction of translation X.

In the embodiment shown, the actuator 1 is configured so that the translation of the rod 4 along the direction of translation X generates the compression of at least one fluid contained in a compression chamber 15, in at least one direction along the direction of translation X.

The anti-rotation torque is preferably directed along the direction of translation X, and therefore has the effect of a moment around the direction of translation X. The anti-rotation torque acts for example in one direction or the other of the double arrow C of FIG. 10, depending on the direction of rotation of the lead nut "N", which is opposite to that of the of anti-rotation torque.

The anti-rotation system 6 is configured to contribute to define, at least partly, the direction of translation X.

The actuator 1 comprises elastic means by means of which it is configured in such a way that the constraining system 5 between the rod 4 and the screw 3 is at least partly elastic at least in a transversal direction. The transversal direction is transversal to the direction of translation X and/or relative to the axis of extension of the rod 4.

In this way, the constraining system 5 allows the radial loads acting on the translation unit and in particular on the screw 3 to be absorbed at least partially. These radial loads comprise a system of transversal forces which act on the translation unit 2, during rotation of the lead nut "N", and which act parallel to the transversal direction.

Ideally, in effect, the axis of extension of the rod 4 is aligned with the direction of translation X, but this practically never occurs, since misalignments are created between the screw 3 and/or the anti-rotation system 6 and/or the rod 4, which cause the onset of these radial loads. These radial loads may also be defined as lateral loads.

These radial loads may be aligned to any direction transversal to the direction of translation X and/or to the axis of extension of the rod 4.

These radial loads can therefore also be at right angles to the direction of translation X.

Figure 8:
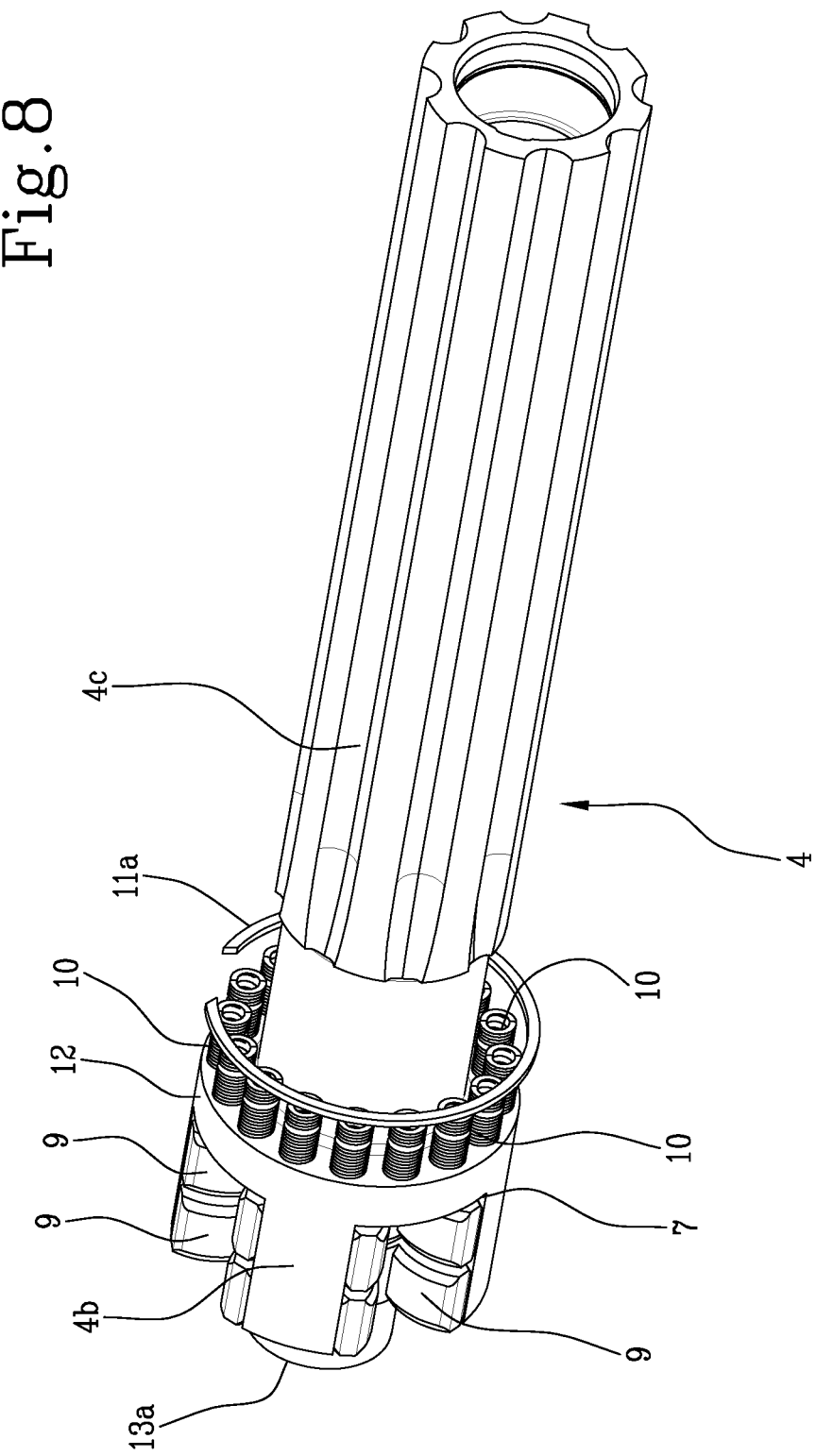
FIG. 8 is equivalent to FIG. 7, but in which a further component of the translation unit has been removed.
Figure 12:
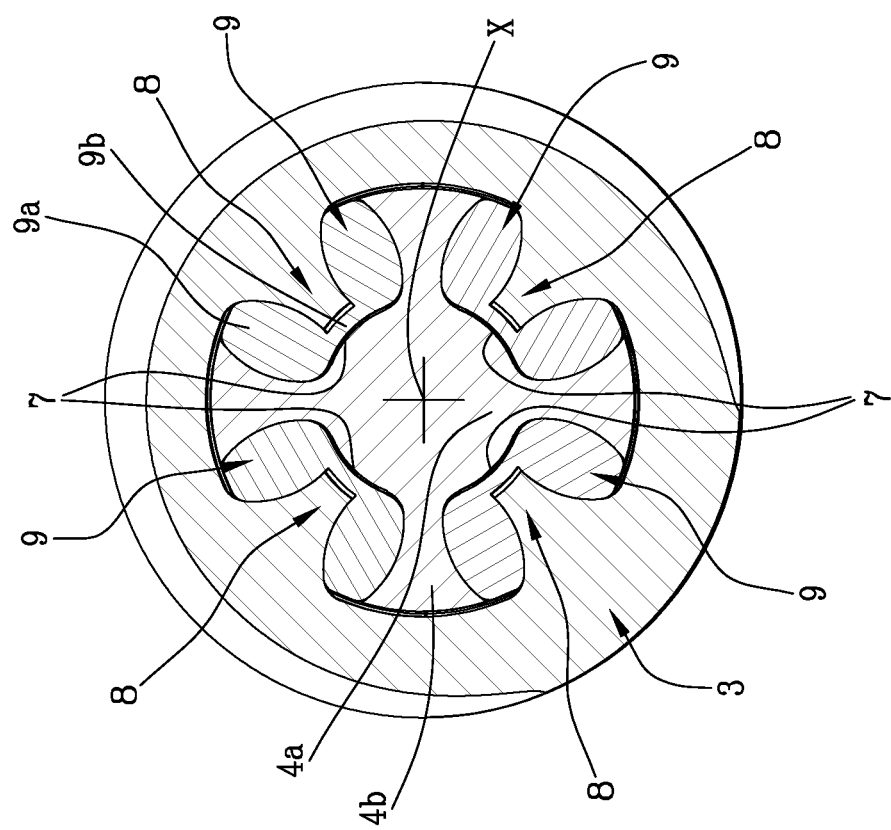
FIG. 12 is a cross section of the translation unit along section XII-XII of FIG. 5.

The elastic means which form part of the constraining system 5 comprise advantageously a plurality of springs 10 angularly distributed around the direction of translation X, as may be seen, for example in FIGS. 8 and 12. The plurality of springs 10, which is part of the constraining system 5, is shown in perspective front view of FIG. 8, and, according to a cross-section at right angles to the direction of translation X, in FIG. 12.

Each of the springs 10 is positioned in such a way as to be designed to act in a direction parallel to the direction of translation X and/or to the axis of extension of the rod 4, and is operatively interposed between the screw 3 and the rod 4. At least two springs of the plurality of springs 10, for example the pair of springs 10a and 10b visible in particular in FIG. 1a, are situated mutually on opposite sides relative to a plane containing the direction of translation X. In this way, by means of at least the springs 10 the constraining system 5 between the screw 3 and the rod 4 is at least partly elastic in a direction transversal to the direction of translation X and/or to the axis of extension of the rod 4, thanks to the possibility of the at least two springs 10a and 10b moving in mutually opposite directions parallel to the direction of translation and/or to the axis of extension.

These at least two springs 10a and 10b of the plurality of springs 10 are preferably positioned symmetrically relative to the direction of translation X.

Preferably, the springs 10 are positioned symmetrically in pairs relative to the direction of translation X.

Figure 6:
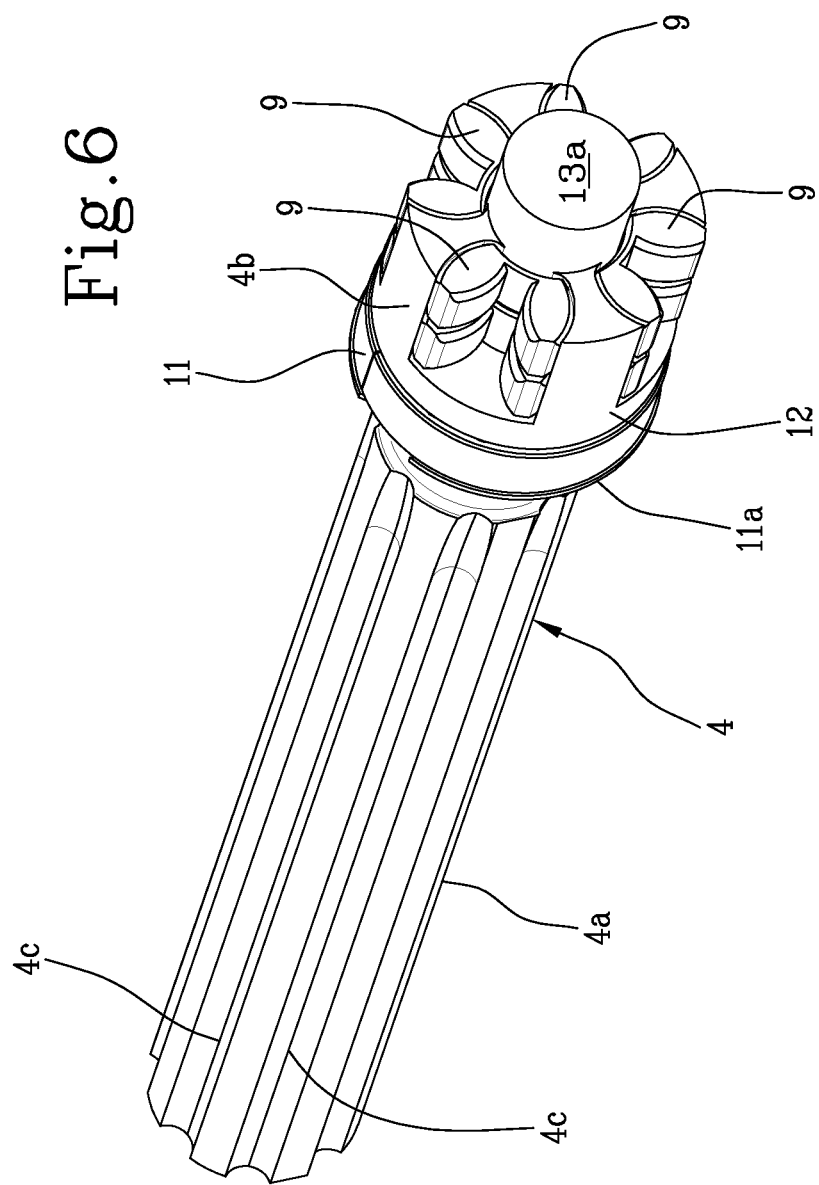
FIG. 6 is a perspective view of a part of the translation unit.
Figure 7:
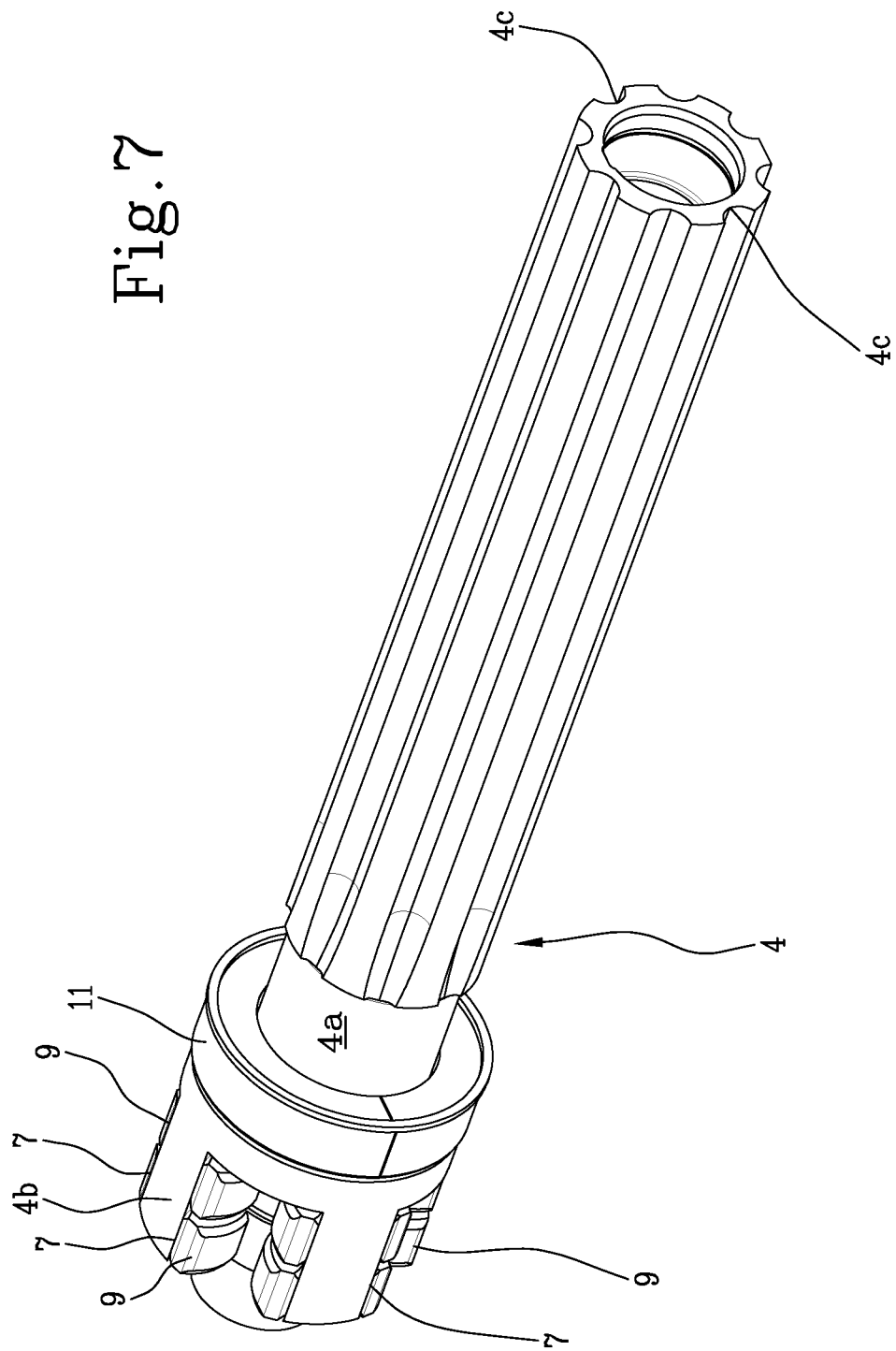
FIG. 7 is another perspective view of the part of the translation unit.

As shown in FIGS. 6 and 7, in the embodiment illustrated in the accompanying drawings, the constraining system 5 comprises a structure which is at least partly annular 11 situated around the rod 4. Advantageously, each spring 10 of the plurality of springs 10 is operatively interposed between the structure which is at least partly annular 11 and a flange 12 which is integral with the rod 4. The at least partly annular structure 11 is preferably at least partly connected to the screw 3. The at least partly annular structure 11, in the embodiment illustrated, is advantageously integral or fixed to the screw 3.

In the embodiment illustrated the structure 11 is located completely around the rod 4 and is therefore annular. The structure 11 may also comprise more different parts.

The at least partly annular structure 11 is not present in FIG. 8, so the springs 10 are visible. FIG. 8 also shows that the at least partly annular structure 11, and hence also the springs 10, are kept in position by preferably at least one Seeger type ring 11a.

The plurality of springs 10, in conjunction with the at least partly annular structure 11, contributes to allowing a small transversal movement between the rod 4 and the screw 3, and hence in a direction transversal to the direction of translation X and/or to the axis of extension of the rod 4.

This small transversal movement is to be considered between at least a part of the rod 4 and at least a part of the screw 3.

This small transversal movement is to be considered small since the constraining system 5, and/or the anti-rotation system 6, are in any case configured to contribute in such a way that the transversal movement of the rod 4 relative to the screw 3 is at least partly limited.

Ideally, the constraining system 5 and the anti-rotation system 6 prevent completely the rigid component from a potential transversal movement of the rod 4 relative to the screw 3, and hence the small transversal movement is limited to the component of deformation of the potential transversal movement.

In this case, the small transversal movement is a lateral deformation of the rod 4, and the constraining system 5, since it is elastic in the transversal direction, contributes to reducing the lateral deformation and therefore the forces due to the lateral deformation. The lateral deformation may comprise a bending deformation of the rod 4 relative to its longitudinal axis of extension.

The constraining system 5 comprises, in the embodiment illustrated, a coupling 13 in the form of a cap at least partly spherical, or at least partly spherical, which contributes to allowing a small transversal rotation of the rod 4 relative to the screw 3. The transversal rotation about a transversal axis or also at right angles to the direction of translation X and/or transversal or also at right angles to the axis of extension of the rod 4.

This small transversal rotation can be considered a particular case of the small transversal movement mentioned above, or as a component of the small transversal movement, which is allowed by the springs 10.

The at least partly spherical coupling 13, in conjunction with the springs 10 and the least partly annular structure 11, contributes to allow this small transversal movement and/or small transversal rotation. This small transversal rotation is also to be considered between at least a part of the rod 4 and at least a part of the screw 3.

This small transversal rotation is to be considered small since the constraining system 5, and/or the anti-rotation system 6, are in any case configured to contribute in such a way that the transversal rotation is at least partly limited.

Ideally, the constraining system 5 and the anti-rotation system 6 prevent completely the rigid component from a potential transversal rotation of the rod 4 relative to the screw 3, and hence the small transversal rotation is limited to the component of deformation of the potential transversal rotation.

In this case, the small transversal rotation is a bending deformation of the rod 4, and the constraining system 5, since it is elastic according to the longitudinal rotation, contributes to reducing the bending deformation and therefore the forces due to the bending deformation.

The at least partially spherical coupling 13 also allows the constraining system 5 between the screw 4 and the rod 3 to be at least partly elastic in a direction transversal to the direction of translation X and/or to the axis of extension of the rod 4.

The springs 10 also advantageously allow the at least partly annular structure 11 to be kept in position in the direction of translation X and/or along the axis of extension of the rod 4. For this purpose the springs 10 are preferably pre-loaded in such a way as to keep the at least partly annular structure 11 in position relative to the screw 3, along the direction of translation X and/or the axis of extension of the rod 4, during the translation of the translation unit 2.

The at least partly spherical coupling 13 preferably comprises a curved surface 13a in the form of a cap integral with the rod 4, and advantageously transversal relative to the axis of extension of the rod 4.

The surface in the form of a cap 13a integral with the rod 4 defines, advantageously, at least a part of a spherical surface.

The at least partly spherical coupling 13 preferably comprises a curved seat 13b integral with the screw 3 and shaped to match the cap 13a which is integral with the rod 4. The seat 13b which is integral with the screw 3 is designed to receive the cap 13a which is integral with the rod 4.

According to this detailed description, due to the elastic means the actuator 1 is configured in such a way that the constraining system 5 between the rod 4 and the screw 3 is at least partly elastic at least also relative to a longitudinal rotation, between the rod 4 and the screw 3, around the direction of translation X and/or about the axis of extension of the rod 3.

Figure 11:
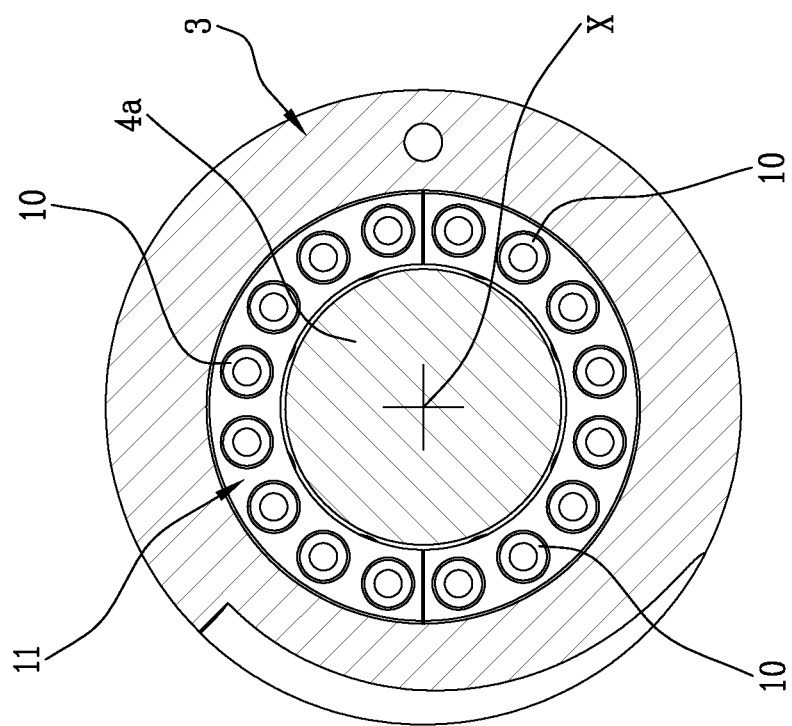
FIG. 11 is a cross section of the translation unit along section XI-XI of FIG. 5.

As shown in FIG. 11, the constraining system 5 advantageously comprises for this purpose preferably a plurality of teeth 8 integral with the rod 4 or with the screw 3.

The constraining system 5 preferably comprises a plurality of respective housings 7 which are integral with the other of either the rod 4 and the screw 3.

In the embodiment illustrated the teeth 8 are integral with the screw 3, as may be seen in FIG. 11.

In the embodiment illustrated the housings 7 are integral with the rod 4, as may be seen in FIG. 11.

Each of the housings 7 is designed to receive a respective of the teeth 8 for transmitting between the rod 4 and the screw 3 the anti-rotation torque exerted by the anti-rotation system 6 on the translation unit 2.

The teeth 8 and the housings 7 are advantageously mutually alternated. The teeth 8 and the housings 7 are preferably angularly distributed around the direction of translation X. The teeth 8 and the housings 7 are preferably distributed along a circumference situated around the direction of translation X.

The elastic means of the constraining system 5 advantageously comprise a plurality of elastic elements 9, each of which being interposed between one of the teeth 8 and the respective housing 7.

Each of the elastic elements 9 may be at least partly interposed between the respective tooth 8 and the respective housing 7, along the circumference.

In this way, in the embodiment illustrated, the constraining system 5 between the screw 3 and the rod 4 is at least partly elastic according to the longitudinal rotation between the screw 3 and the rod 4 about the axis of translation and/or the axis of extension of the rod 4. These elastic elements are in effect positioned in such a way as to be designed to act according to the longitudinal rotation.

Each of the elastic elements 9 may be at least partly interposed between the respective tooth 8 and the respective housing 7, also radially and therefore in a direction transversal to the direction of translation X and/or to the axis of extension of the rod 4, and therefore along a line transversal to the direction of translation X and/or to the axis of extension of the rod 4.

In the embodiment illustrated, as my be seen in FIG. 11, advantageously at least a part, for example the one labelled 9a, of each of the elastic elements 9, is interposed between the respective tooth 8 and the respective housing 7, along the circumference. In the embodiment illustrated, at least another part, for example that labelled 9b, of each of the elastic elements 9 is interposed between the respective tooth 8 and the respective housing 7, radially relative to the direction of translation X.

The elastic elements 9 may be made at least partly in at least a plastic material, such as, for example, polyurethane.

These elastic elements 9 contribute towards allowing a small longitudinal rotation between the screw 3 and the rod 4 about the axis of translation X and/or the axis of extension of the rod 4.

This small longitudinal rotation is to be considered between at least a part of the rod 4 and at least a part of the screw 3.

This small longitudinal rotation is to be considered small since the constraining system 5, and/or the anti-rotation system 6, are each configured to contribute in such a way that the longitudinal rotation of the rod 4 relative to the screw 3 is at least partly limited.

Ideally, the constraining system 5 and the anti-rotation system 6 prevent completely the rigid component from a potential longitudinal rotation of the rod 4 relative to the screw 3, and hence the small longitudinal rotation is limited to the component of deformation of the potential longitudinal rotation.

In this case, the small longitudinal rotation is a torsional deformation of the rod 4, and the constraining system 5, since it is elastic according to the longitudinal rotation, contributes to reducing the torsional deformation and therefore the forces due to the torsional deformation.

The same elastic elements 9 can also contribute to allow a small transversal movement between the rod 4 and the screw 3. More specifically, in the embodiment illustrated, this is contributed to by the fact that at least a part 9b of each elastic element 9 is interposed between respective tooth 8 and respective housing 7 also along a direction radial to the direction of translation X.

In the embodiment illustrated, the constraining system 5 is situated in a cavity 3a integral with the screw 3. The cavity 3a extends preferably along the axis of extension of the rod 4 and/or along the direction of translation X. The cavity 3a may be considered part of the constraining system 5.

In the embodiment illustrated, the rod 4 comprises an elongate central body 4a designed to define the axis of extension of the rod 4, as indicated, for example, in FIGS. 6-12.

In the embodiment illustrated, the housings 7 of the constraining system 5 are made in a crown 4b integral with the rod 4 and situated about a sector of the central body 4a, as may be seen, for example, in FIGS. 6-11.

The flange 12, to which the springs 10 are connected, is preferably part of the crown 4b, as shown for example in FIGS. 6-10.

The cavity 3a is advantageously designed to define the seat 13b on a surface of the cavity 3a transversal and preferably at right angles to the direction of translation X and/or the axis of extension of the rod 4, as shown in FIGS. 1 and 1a.

The cavity 3a is designed to house, in the embodiment illustrated, the constraining system 5.

The cavity 3a has advantageously inside it the teeth 8 described above, designed to couple with the elastic elements 9 located in the housings 7 integral with the rod 4.

In the embodiment illustrated, the actuator 1 advantageously comprises a supporting structure 14.

The supporting structure 14 is designed to contain at least partly the screw motor "M", screw, lead nut "N" and rod. The rotation of the lead nut "N" and translation of the translation unit 2 are carried out, in the embodiment illustrated, relative at least to the supporting structure 14.

In the embodiment illustrated, the supporting structure 14 comprises a main portion 14a and at least an interface portion 14b. The main portion 14a and the interface portion 14b, in the embodiment illustrated, are positioned one after another along the direction of translation X. Under normal conditions, such as those shown in FIG. 13a, the interface portion 14b and the main portion 14a are preferably mutually adjacent.

Figure 4:
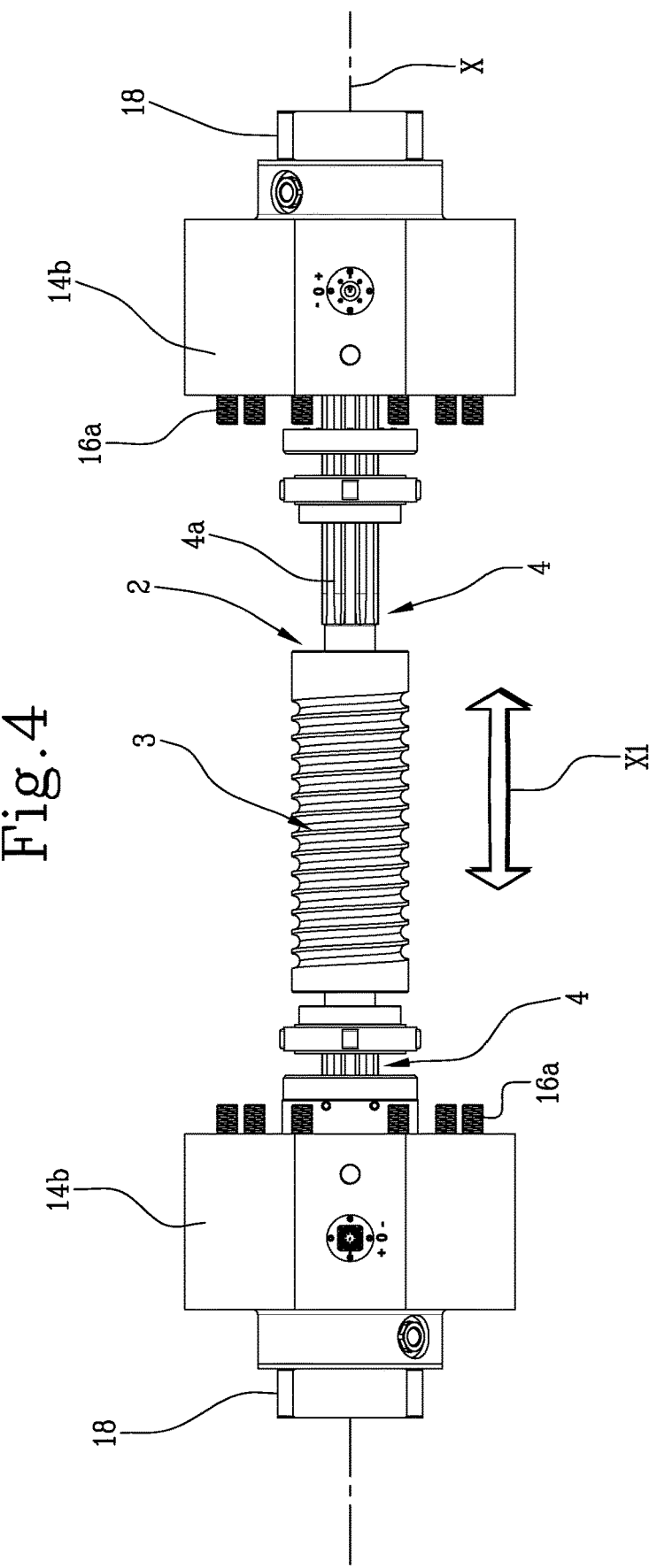
FIG. 4 is a side view of the embodiment with at least one component removed, different from that removed in FIG. 3.
Figure 5:
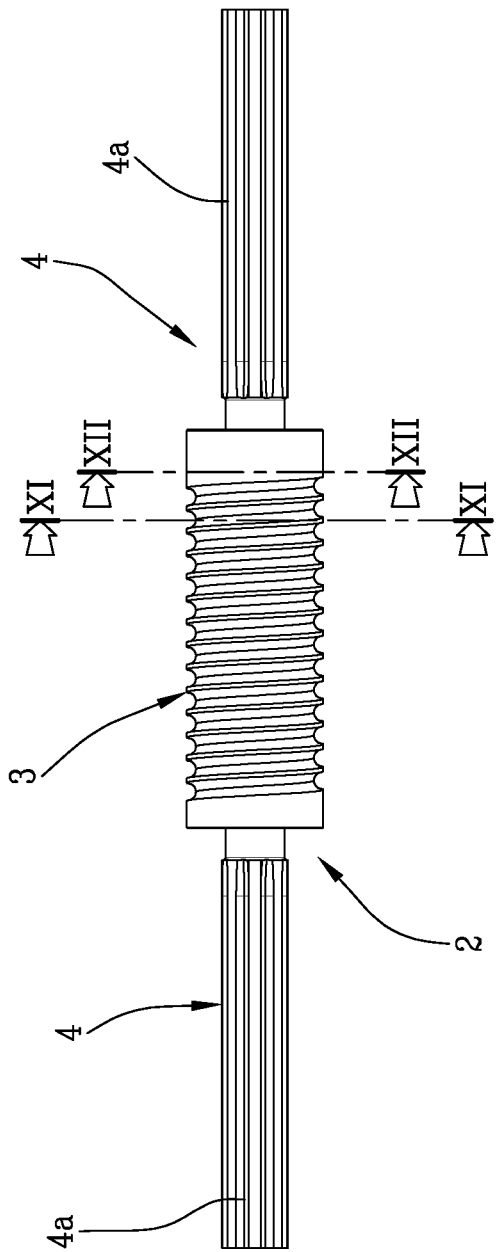
FIG. 5 is a side view of the translation unit of the embodiment.

In the embodiment illustrated, the supporting structure 14 comprises two equivalent interface portions 14b, on one side and the other of the main portion 14a, along the direction of translation X, In FIG. 3 one of the interface portions 14b is removed, whilst in FIG. 4 both the interface portions 14b are shown, but the main portion 14a is removed.

FIG. 3 shows also a double arrow X1 indicating the preferably alternating translation of the translation unit 2, along the direction of translation X.

The main portion 14a, as may be seen in FIG. 1 and as may be inferred from FIG. 4, is designed preferably to support at least the lead nut "N", the screw 3 and the motor "M". In the example shown, the main portion 14a is designed to contain, thus acting as a casing, at least the lead nut "N", the screw 3 and the motor "M".

Figure 13A:
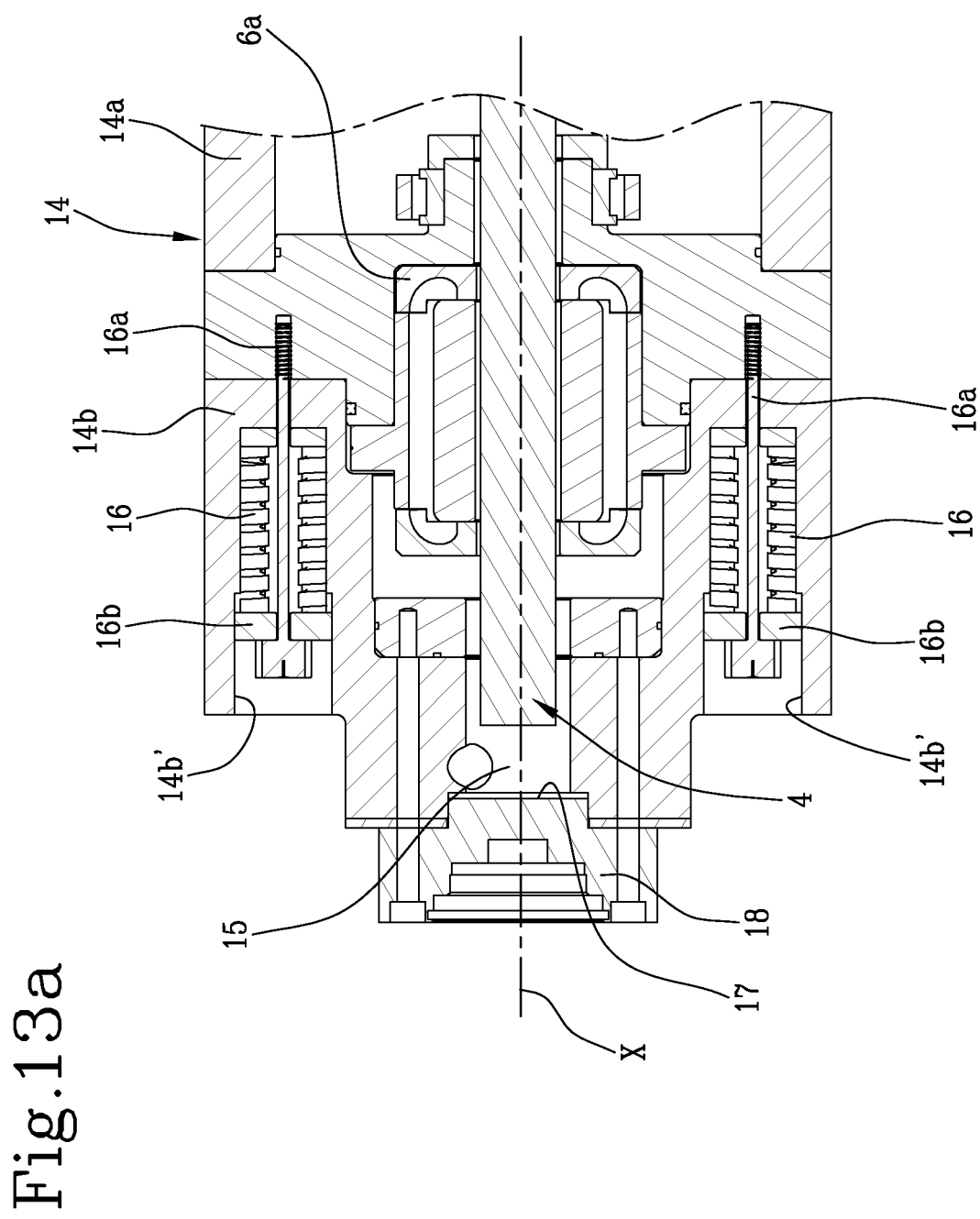
FIG. 13a is a view of a part of the embodiment in cross section along the plane of FIG. 1.

The interface portion 14b is designed, in the particular application to which the accompanying drawings refer, to define at least partially a compression chamber 15, as indicated in FIGS. 1 and 13a. The compression chamber 15 is positioned advantageously in such a way that the translation of the rod 4 along the direction of translation X generates the compression of at least one fluid, for example water, contained in the compression chamber 15.

The interface portion 14b in the embodiment illustrated, comprises a nozzle 18 from which the fluid compressed by the rod 4 escapes, positioned in such a way as to be passed through by the direction of translation X.

The anti-rotation system 6, in the embodiment illustrated, comprises a locking body 6b designed for the sliding of the rod 4 through the locking body 6b, along the direction of translation X. The locking body 6b is configured to exert at least one part of the anti-rotation torque on the translation unit 2, but may be also designed to guide the translation of the translation unit 2 along the direction of translation X.

The locking element 6b has projections angularly distributed around the direction of translation X and positioned in such a way that they face towards the rod 4 when the latter passes through the locking body 6b.

The anti-rotation system 6 comprises, in the embodiment illustrated, at least one linear bearing 6a, preferably of the recirculating ball type. The bearing 6a is suitable for sliding the rod 4 through the bearing 6a, along the direction of translation X. The linear bearing 6a is designed to guide the translation of the translation unit 2 along the direction of translation X, but can also be designed to exert at least a part of the anti-rotation torque on the translation unit 2.

The rod 4 advantageously has at least one groove 4c for the sliding of at least a series of balls parallel to the direction of translation X.

The at least one groove 4c is situated advantageously on the outer surface of the rod 4, and preferably on the main body 4a of the rod 4.

The rod 4 in the embodiment illustrated has a plurality of grooves 4c each designed for the sliding of a respective series of balls parallel to the direction of translation X. The plurality of grooves 4c are angularly distributed around the direction of translation and/or around the axis of extension of the rod 4.

The grooves 4c are advantageously designed to operate in act in conjunction with the projections on the locking body 6b in such a way that the locking body 6b can exert at least a part of the anti-rotation torque on the rod 3.

In the embodiment illustrated, the locking body 6b and the linear bearing 6a are located one after the other along the direction of translation X.

In the embodiment illustrated, the anti-rotation system 6 is operatively interposed between the supporting structure 14 and the rod 4. In the embodiment illustrated, the actuator 1 is configured in such a way that the anti-rotation system 6 acts directly on the rod 4 and, through the rod 4, on the screw 3, to exert the anti-rotation torque on the translation unit 2.

In this way, the anti-rotation system 6, in the embodiment illustrated, by acting directly on the rod 4, advantageously makes it possible to not have an intermediate shaft between the motor "M" and lead nut "N", thus achieving a saving in material and mechanical complexity of the actuator 1.

Figure 9:
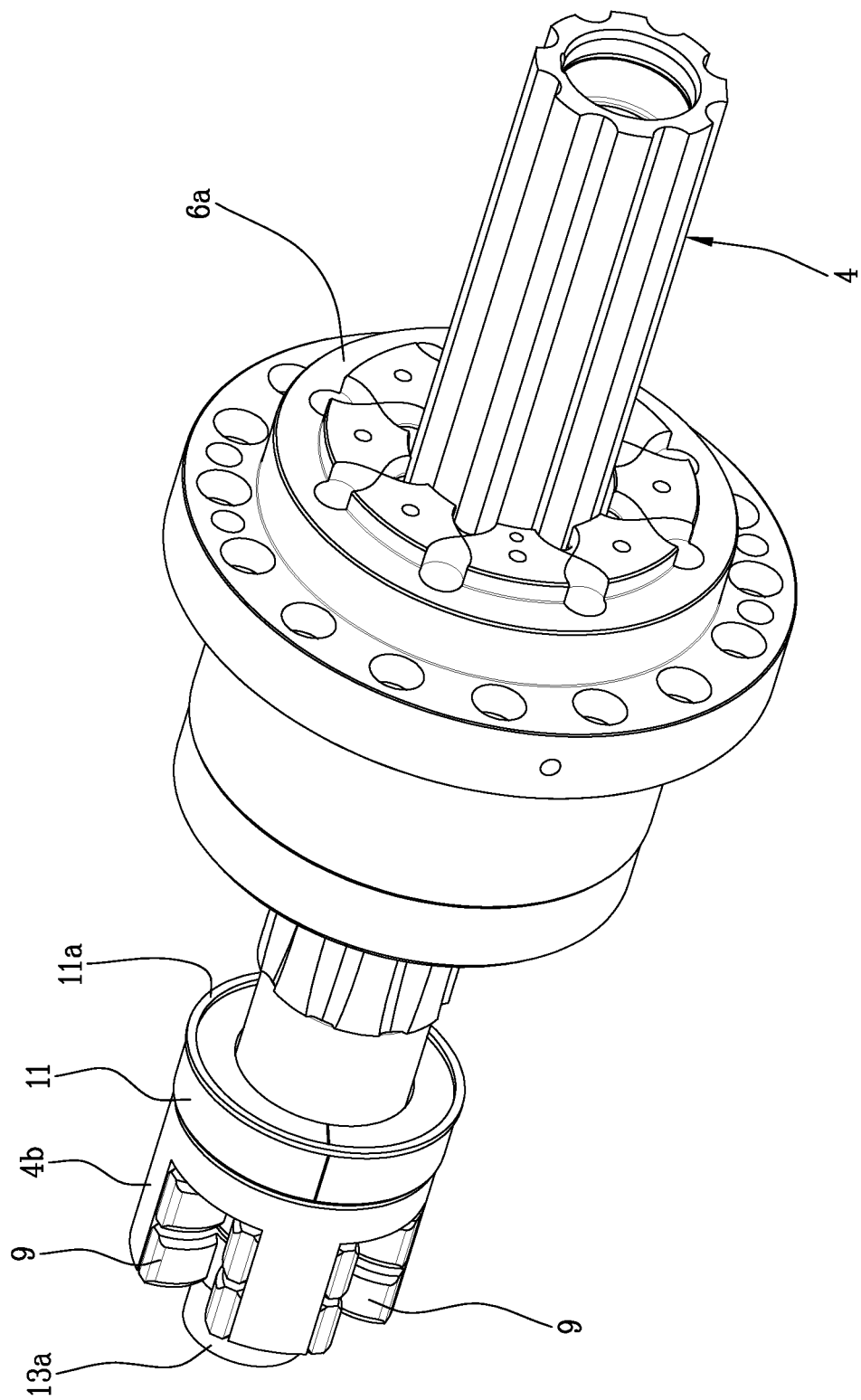
FIG. 9 is a view which comprises the components shown in FIG. 7 and a part of an anti-rotation system acting on the translation unit.

FIG. 9 shows the anti-rotation system 6 passed through by the rod 4, with the locking element 6b removed. In FIG. 10 the anti-rotation system 6 is shown, on the other hand, entirely.

In the embodiment illustrated, the main portion 14a and the interface portion 14b are movable relative to each other parallel to the direction of translation X. The actuator 1 advantageously comprises a shock absorbing system which in turn comprises a plurality of damping springs 16 angularly distributed around the direction of translation X. Each of the damping springs 16 is preferably positioned in such a way as to be designed to act in a direction parallel to the direction of translation X and/or to the axis of extension of the rod 4. Each of the shock absorbing springs 16 is operatively interposed between the interface portion 14b and the main portion 14a.

Each of the damping springs 16, as may be seen in FIGS. 1, 4, and 13a-13c, is associated advantageously with a respective guide pin 16a designed to be connected, and preferably screwed, to the main portion 14a. The pin 16a is designed to guide the movement of the respective damping spring.

The connection between the interface portion 14b and the main portion 14a using the guide pins 16a is advantageously functional to keep mutually in position the interface portion 14b relative to the main portion 14a, under normal conditions wherein the rod 4 and/or the screw 3 do not accidentally knock against other components of the actuator 1. Under normal conditions, the shock absorbing system is advantageously configured, by means of the guide pins 16a, to keep the interface portion 14b and the main portion 14a mutually adjacent.

Each of the shock absorbing springs 16 is associated with a respective sliding element 16b designed to slide in a respective cavity 14b' of the interface portion 14b. Under normal conditions, each of the two slidable elements 16b is designed preferably to keep compressed the respective damping spring 16.

The slidable element 16b is designed to be positioned on the end opposite the guide pin 16a with respect to that at which the pin 16a is designed to be fixed to the main portion 14a.

The interface portion 14b is designed to be integral with a contact surface 17, or to define the contact surface 17. The contact surface 17 is located preferably on the front of the rod 4, along the direction of translation X and/or the axis of extension of the rod 4.

The actuator 1 is configured in such a way that the accidental contact of the rod 4 against the contact surface 17, following the translation of the rod 4, causes the movement between the interface portion 14b and the main portion 14a in opposition to the damping springs 16 interposed between the interface portions 14b and the main portion 14a.

In FIG. 13a the rod 4 is moving, through the compression chamber 15, towards the nozzle 18 integral with the interface portion 14b.

Figure 13B:
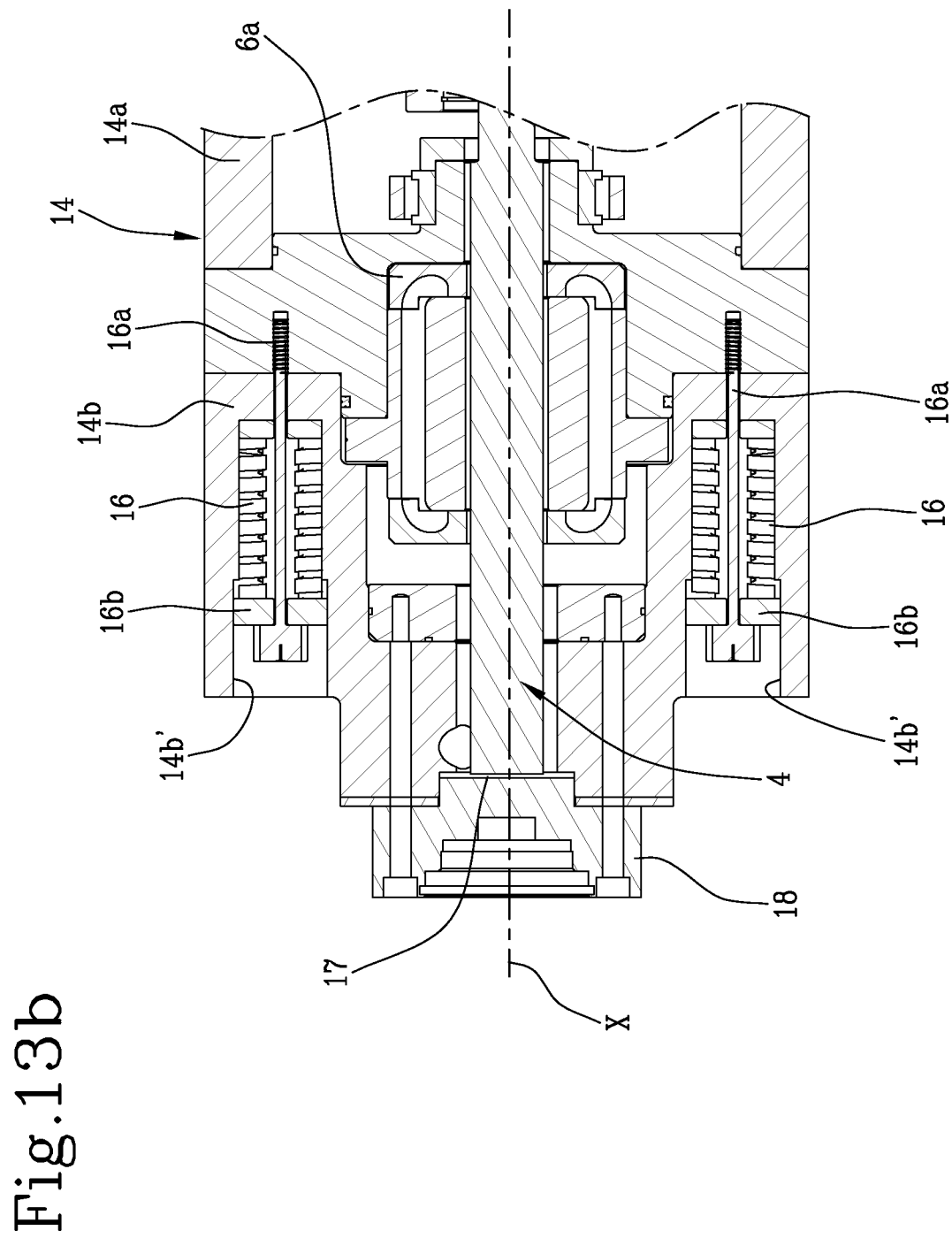
FIG. 13b is a view of the part of FIG. 13a in which, with respect to FIG. 13a, the translation unit is advanced relative to the supporting structure of the actuator along the direction of translation.

In FIG. 13b the rod 4 is accidentally in contact with the contact surface 17, and the interface portion 14b and the main portion 14a are still in their position normal, as shown in FIG. 1 or 2.

Figure 13C:
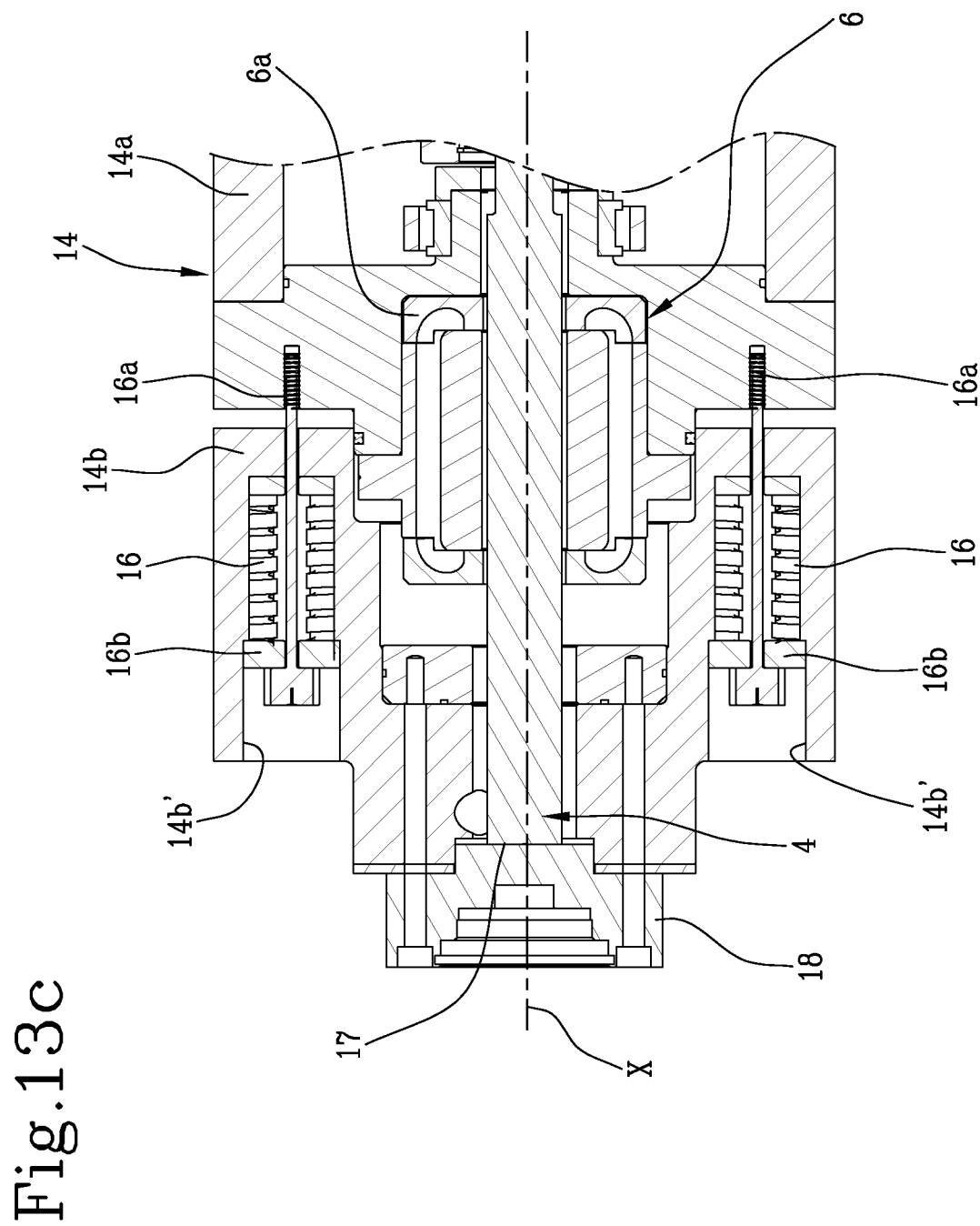
FIG. 13c is a view of the part of FIG. 13a, in which, with respect to FIG. 13b, a portion of the supporting structure is moved relative to another portion of the supporting structure.

In FIG. 13c, following this contact, the interface portion 14b has moved relative to the main portion 14a along the direction of translation X.

The shock absorbing system is preferably configured to move, subsequently, the interface portion 14b and the main portion 14a in the normal position of FIG. 13b or 13a.

Preferably, at least one between the linear bearing 6a and the locking element 6b is integral with the main portion 14a of the supporting structure 14.

In the embodiment illustrated, both the bearing 6a and the locking body 6b are integral and/or fixed to the main portion 14a of the supporting structure 14, as may be seen in FIG. 13c which shows that the anti-rotation system 6 remains fixed relative to the main portion 14a despite the movement allowed by the damping springs 16 between the main portion 14a and contact portion 14b.

The positioning of the damping springs 16 may in any case be reversed relative to the axis of translation X, and the guide pins 16a might therefore be connected or screwed to the interface portion 14b instead of to the main portion 14a. In this case, the cavity 14b' would be integral with the main portion 14a The movement allowed between the main portion 14a and the interface portion 14b, by means of the damping springs 16, is functional to completely absorb the impact caused by the impact of the screw 3 and/or the rod 4 against other components of the actuator 1, due to the loss of control of the translation of the translation unit 2. Moreover, this movement allows the interface portion 14b to be moved away in order to protect other components connected to the actuator 1, for example which form part of a pump or a intensifier comprising the actuator 1.

As shown in FIG. 1, the actuator presented in the accompanying drawings is double-acting, and therefore comprises two rods 4 located on opposite sides of the screw 3. The features previously described for the rod 4 and the constraining system 5 between the screw 3 and the rod 4 can apply for each of the two rods 4 of FIG. 1 and for each of the constraining systems 5 indicated in FIG. 1.

Further, the features described for an portion interface 14b, and in particular its mobility relative to the main portion 14a in opposition to a plurality of springs 16, can also apply for the other interface portion 14b.

Moreover, the rotation of the lead nut "N" caused by the motor "M" is preferably alternating, and therefore the translation of the translation unit X is also alternating.

What is claimed:

1. A linear actuator for water cutting, comprising a motor operatively associated with a lead nut so to cause a rotation of the lead nut about a direction of translation of the lead nut, a translation unit comprising a screw coupled to the lead nut and at least one rod constrained to the screw by a constraining system, the actuator comprising an anti-rotation system designed to exert an anti-rotation torque on the translation unit so that the rotation of the lead nut causes a translation of the translation unit along the direction of translation,
wherein the constraining system comprises elastic means by means of which the constraining system is at least partly elastic at least in a direction which is transversal to the direction of translation, so as to at least partly absorb the radial loads acting parallel to the transversal direction during the rotation of the lead nut on the translation unit,
wherein the elastic means comprise a plurality of springs which are angularly distributed around the direction of translation, each of which is designed to act in a direction parallel to the direction of translation and is operatively interposed between the screw and the rod, at least two springs of the plurality being located on opposite sides from each other relative to a plane containing the direction of translation, wherein the two springs are configured to allow moving in opposite directions from each other parallel to the direction of translation and/or to an axis of extension.

2. The actuator according to claim 1, wherein, due to the elastic means, the constraining system is at least partly elastic with respect to at least a longitudinal rotation between rod and screw around the direction of translation and/or the axis of extension.

3. The actuator according to claim 1, wherein the constraining system comprises a structure which is at least partly annular located around the rod, wherein each of the plurality of springs is operatively interposed between the at least partly annular structure and a flange which is integral with the rod, the structure being integral with the screw.

4. The actuator according to claim 3, wherein the constraining system comprises an at least partly spherical coupling, which in conjunction with the springs, is configured to allow a small transversal rotation of the rod with respect to the screw.

5. The actuator according to claim 1, wherein the constraining system comprises an at least partly spherical coupling, which in conjunction with the springs, is configured to allow a small transversal rotation of the rod with respect to the screw.

6. The actuator according to claim 1, wherein the constraining system comprises a plurality of teeth which are integral with one from the rod and screw, and a plurality of respective housings which are integral with the other from the rod and screw, each of the housings being designed to receive one of the respective teeth for transmitting the anti-rotation torque between the rod and the screw,
the teeth and the housings being alternated with each other and being angularly distributed around the direction of translation and along a circumference located around the direction of translation,
wherein the elastic means comprise a plurality of elastic elements, each of which being interposed between one of the teeth and the respective housing.

7. The actuator according to claim 6, wherein each of the elastic elements is at least partly interposed between the respective tooth and the respective housing along the circumference.

8. The actuator according to claim 7, wherein each of the elastic elements is at least partly interposed between the respective tooth and the respective housing, radially relative to the direction of translation.

9. The actuator according to claim 6, wherein each of the elastic elements is at least partly interposed between the respective tooth and the respective housing, radially relative to the direction of translation.

10. The actuator according to claim 1, further comprising a supporting structure designed to at least partly contain the motor, screw, lead nut, and rod, the rotation and the translation being relative to at least the supporting structure.

11. The actuator according to claim 10, wherein the supporting structure comprises a main portion and an interface portion, which are arranged one after the other along the direction of translation, the main portion being designed to house at least the lead nut and the screw and the interface portion being designed to define at least a part of a compression chamber, wherein the main portion and the interface portion are movable relative to each other parallel to the direction of translation and opposing a plurality of shock absorbing springs, which are angularly distributed around the direction of translation, each of which being designed to act in a direction parallel to the direction of translation and/or to the axis of extension and operatively interposed between the portions.

12. The actuator according to claim 11, wherein the interface portion is designed to be integral with a contact surface or to form the contact surface, so that the accidental contact of the rod against the contact surface after the translation causes the movement between the portions opposing the shock absorber springs.

13. The actuator according to claim 12, wherein the anti-rotation system is operatively interposed between the supporting structure and the rod and is configured to exert the anti-rotation torque directly on the rod during the rotation of the lead nut so that the anti-rotation torque is also transmitted to the screw by the interposition of the rod and of the constraining system.

14. The actuator according to claim 11, wherein the anti-rotation system is integral with the main portion.

15. The actuator according to claim 11, wherein the anti-rotation system is operatively interposed between the supporting structure and the rod and is configured to exert the anti-rotation torque directly on the rod during the rotation of the lead nut so that the anti-rotation torque is also transmitted to the screw by the interposition of the rod and of the constraining system.

16. The actuator according to claim 10, wherein the anti-rotation system is operatively interposed between the supporting structure and the rod and is configured to exert the anti-rotation torque directly on the rod during the rotation of the lead nut so that the anti-rotation torque is also transmitted to the screw by the interposition of the rod and of the constraining system.

17. The actuator according to claim 1, wherein the anti-rotation system comprises at least one linear recirculating ball bearing and the rod has at least one groove for sliding at least one series of the balls of the bearing parallel to the direction of translation.

18. The actuator according to claim 1, configured so that the translation of the rod along the direction of translation generates the compression of at least one fluid contained in a compression chamber, in at least one direction along the direction of translation.

* * * * *